United States Patent
Nhan et al.

(10) Patent No.: US 11,429,271 B2
(45) Date of Patent: Aug. 30, 2022

(54) METHODS AND USER INTERFACES FOR GENERATING LEVEL OF DETAIL CALCULATIONS FOR DATA VISUALIZATIONS

(71) Applicant: Tableau Software, LLC, Seattle, WA (US)

(72) Inventors: Thomas Nhan, Seattle, WA (US); Allan Folting, Woodinville, WA (US); Daniel Philip Cory, Seattle, WA (US); Justin Talbot, Seattle, WA (US); Lauren Christina Lum, West Lafayette, IN (US); Elaine Weatherfield Sulc, Seattle, WA (US); Susan Denise Doan, Brier, WA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 0 days.

(21) Appl. No.: 17/095,696

(22) Filed: Nov. 11, 2020

(65) Prior Publication Data
US 2022/0019323 A1    Jan. 20, 2022

Related U.S. Application Data

(60) Provisional application No. 63/087,862, filed on Oct. 5, 2020, provisional application No. 62/933,940, filed on Nov. 11, 2019.

(51) Int. Cl.
*G06F 3/048*    (2013.01)
*G06F 3/0486*    (2013.01)
*G06F 3/04847*    (2022.01)

(52) U.S. Cl.
CPC ........ *G06F 3/0486* (2013.01); *G06F 3/04847* (2013.01)

(58) Field of Classification Search
CPC ... G06F 3/0486; G06F 3/04847; G06F 16/904
See application file for complete search history.

(56) References Cited

U.S. PATENT DOCUMENTS 8,306,971 B2  11/2012  Stolte et al.
9,501,585 B1  11/2016  Gautam et al.
(Continued)

OTHER PUBLICATIONS

Sleeper, Ryan (Practical Tableau, https://learning.oreilly.com/library/view/practical-tableau/9781491977309/, Apr. 2018) (Year: 2018).*

(Continued)

*Primary Examiner* — Aleksey Olshannikov
(74) *Attorney, Agent, or Firm* — Morgan, Lewis & Bockius LLP

(57) ABSTRACT

A computing device displays a data visualization interface and receives user selection of a data source. The computing device also receives user input to select a measure data field and a dimension data field. In response to the user input, the computing device: generates a custom calculation that aggregates data for the measure data field, grouped by distinct data values of the dimension data field; and stores the custom calculation as a new selectable data field, associated with a data object corresponding to the dimension data field. The computing device also receives user selection of the new selectable data field and placement of the new selectable data field onto a first shelf in a shelf region. The first shelf defines a first data visualization characteristic determined according to data values of the custom calculation. The computing device generates and displays a data visualization based on the first data visualization characteristic.

20 Claims, 16 Drawing Sheets

(56) References Cited

U.S. PATENT DOCUMENTS

| | | | |
|---|---|---|---|
| 9,665,662 | B1 | 5/2017 | Gautam et al. |
| 10,515,121 | B1 | 12/2019 | Setlur et al. |
| 2002/0059204 | A1 | 5/2002 | Harris |
| 2007/0300172 | A1* | 12/2007 | Runge .................... G06Q 30/02 |
| | | | 715/764 |
| 2011/0112837 | A1 | 5/2011 | Kurki-Sounio et al. |
| 2014/0236579 | A1 | 8/2014 | Kurz |
| 2016/0070451 | A1* | 3/2016 | Kim ...................... G06F 16/904 |
| | | | 715/765 |
| 2018/0032576 | A1 | 2/2018 | Romero |
| 2018/0129513 | A1* | 5/2018 | Gloystein ........... G06F 3/04842 |
| 2018/0129720 | A1* | 5/2018 | Kim ...................... G06F 16/258 |
| 2018/0144065 | A1 | 5/2018 | Yellali |
| 2019/0018839 | A1 | 1/2019 | Ge et al. |
| 2019/0026318 | A1 | 1/2019 | Bertellotti et al. |
| 2019/0138648 | A1 | 5/2019 | Gupta et al. |
| 2020/0065385 | A1 | 2/2020 | Dreher et al. |
| 2020/0110803 | A1 | 4/2020 | Djalali et al. |

OTHER PUBLICATIONS

Cimiano, Philipp, et al. "Towards portable natural language interfaces to knowledge bases—The case of the ORAKEL system." Data & Knowledge Engineering 65.2, Nov. 2007, pp. 325-354, (Year: 2007).

Djalali, Preinterview First Office Action, U.S. Appl. No. 16/166,125, dated May 5, 2020, 19 pgs.

Djalali, First Action Interview Office Action, U.S. Appl. No. 16/166,125, dated Sep. 9, 2020, 20 pgs.

Djalali, Quayle Office Action, U.S. Appl. No. 16/166,125, dated Mar. 3, 2021, 8 pgs.

Djalali Notice-of-Allowance, U.S. Appl. No. 16/166,125, dated Mar. 17, 2021, 7 pgs.

Gao, Tong, et al. "Datatone: Managing ambiguity in natural language interfaces for data visualization." Proceedings of the 28th Annual ACM Symposium on User Interface Software & Technology, Nov. 2015, pp. 489-500, (Year: 2015).

Matsushita, Mitsunori, Eisaku Maeda, and Tsuneaki Kato. "An interactive visualization method of numerical data based on natural language requirements." International journal of human-computer studies 60.4, Apr. 2004, pp. 469-488. (Year: 2004).

Popescu, et al. "Towards a theory of natural language interfaces to databases." Proceedings of the 8th international conference on Intelligent user interfaces. Jan. 2003, pp. 149-157, (Year: 2003).

Sang Yun et al: "A phrase-driven grammar system for interactive data visualization," Proceedings of SPIE, vol. 6809, Jan. 27, 2008, p. 68090k, XP055650259, 1000 20th St. Bellingham WA 98225-6705 USA, ISBN: 978-1-5106-2687-4, 13 pgs.

Stolte et al., "Polaris: A system for query, analysis, and visualization of multidimensional relational databases," IEEE Transactions on Visualization and Computer Graphics 8, No. 1 (2002): 52-65-, (Year: 2002).

Tableau Software, Inc., International Search Report and Written Opinion, PCT/US2019/055169, dated Dec. 16, 2019, 12 pgs.

Tresor Mvumbi: "Natural Language Interface to Relational Database: A Simplified Customization Approach," Dissertation presented for the Degree of Master of Science in the Department of Computer Science, Aug. 2016, XP055650275, retrieved from htttps://open.uct.ac.za/bitstream/handle/11427/23058/thesis_sci_2016_mvumbi_tresor.pdf?sequece=1&iAllowed=y.

Vidya Setluer et al.: "Eviza" User Interface Software and Technology, ACM, 2 Penn Plaza, Suite 701 New Yourk NY 10121-0701 USA, Oct. 16, 2016, pp. 365-377, XP058299767, DOI: 10.1145/2984511.2984588, ISBN: 978-1-4503-4189-9, 13 pgs.

* cited by examiner

METHODS AND USER INTERFACES FOR GENERATING LEVEL OF DETAIL CALCULATIONS FOR DATA VISUALIZATIONS

RELATED APPLICATIONS

This application claims priority to U.S. Provisional Patent Application No. 62/933,940, filed Nov. 11, 2019, entitled "Methods and User Interfaces for Determining Level of Detail for Data Visualizations" and U.S. Provisional Patent Application No. 63/087,862, filed Oct. 5, 2020, entitled "Methods and User Interfaces for Generating Level of Detail Calculations for Data Visualizations," each of which is incorporated by reference in its entirety.

This application is related to U.S. patent application Ser. No. 16/166,125, filed Oct. 21, 2018, titled "Determining Levels of Detail for Data Visualizations Using Natural Language Constructs," which is incorporated by reference herein in its entirety.

TECHNICAL FIELD

The disclosed implementations relate generally to data visualization and more specifically to systems, methods, and user interfaces that enable users to interact with data visualizations and analyze data using drag-and-drop operations.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks. In particular, Level of Detail expressions are a powerful tool to aggregate data at different levels.

SUMMARY

There is a need for improved systems and methods that support interactions with visual analytical systems. The present disclosure describes methods that resolve user input on user interfaces to formal queries that can be executed against a visual analytics system (e.g., a data visualization application). The method further supports multiple aggregation levels in a single data visualization. Thus, the methods and user interfaces reduce the cognitive burden on a user and produces a more efficient human-machine interface.

Level of Detail expressions (also known as LOD expressions) allow a user to compute values at the data source level and the visualization level. LOD expressions can provide control on the level of granularity for computations. For example LOD expressions can be performed at a more granular level (INCLUDE), a less granular level (EXCLUDE), or an entirely independent level (FIXED). Some implementations enable users to specify or create and/or modify such LOD expressions, via intuitive graphical user interfaces.

According to some implementations, a method is provided for generating level of detail calculations for data visualizations. The method is performed at a computing device having a display, one or more processors, and memory storing one or more programs configured for execution by the one or more processors. The method includes receiving user selection of a data source. The method also includes displaying a data visualization interface, including: a data visualization region; a shelf region with a plurality of shelves, each shelf defining a respective characteristic of a data visualization based on placement of data fields onto the respective shelf; and a schema information region displaying a plurality of data objects, wherein each data object has one or more selectable data fields, and each data field is designated as a dimension or a measure. The method also includes receiving user input to select a measure data field and a dimension data field from the schema information region. The method also includes, in response to the user input: generating a custom calculation that aggregates data for the measure data field, grouped by distinct data values of the dimension data field; and storing the custom calculation as a new selectable data field, associated with a data object corresponding to the dimension data field. The method also includes receiving user selection of the new selectable data field and placement of the new selectable data field onto a first shelf in the shelf region, wherein the first shelf defines a first data visualization characteristic; and generating and displaying a data visualization in the data visualization region, wherein the first data visualization characteristic of the data visualization is determined according to data values of the custom calculation.

In some implementations, the user input is a drag-and-drop operation comprising dragging the measure data field and dropping the measure data field over the dimension data field. In some implementations, the dimension data field is a primary key or alternative key of the data object corresponding to the dimension data field. In some implementations, the user input further comprises: user initiation of a context menu associated with the measure data field or the dimension data field; and selecting a context menu option to build the custom calculation. In some implementations, the method further includes, in response to the user selection of the context menu option: displaying a dialog window, populated by the generated custom calculation; and detecting a second user input in the dialog window to edit the custom calculation, and storing the custom calculation as a new selectable data field is in response to detecting user activation of a save affordance in the dialog window.

Although the specific examples illustrated below use a single dimension data field and a single measure data field, the same techniques can be applied to additional fields. For example, a user may select two or more dimension fields, then drag a measure field to any one of them. In this case, the data visualization application generates an LOD expression with grouping by the combination of all of the specified dimension data fields. For example, with two dimensions and one measure, the generated LOD expression is {FIXED [dimension 1], [dimension 2]: SUM([measure])}.

In some implementations, the custom calculation is of the form {FIXED [field1]: AGG([field2])}, where "field1" is a name of the dimension data field, "AGG" is an aggregation operator, and "field2" is a name of the measure data field. In some implementations, the aggregation operator is one of SUM, COUNT, AVERAGE, MIN, and MAX.

In some implementations, generating and displaying the data visualization in the data visualization region includes: generating one or more database queries directed to the data source according to user placement of data fields from the schema information region onto shelves in the shelf region, including placement of the new selectable data field onto the first shelf; executing the one or more database queries to retrieve one or more data sets from the data source, including aggregated data for the measure data field grouped according to the dimension data field; and generating and displaying the data visualization according to the retrieved data sets.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
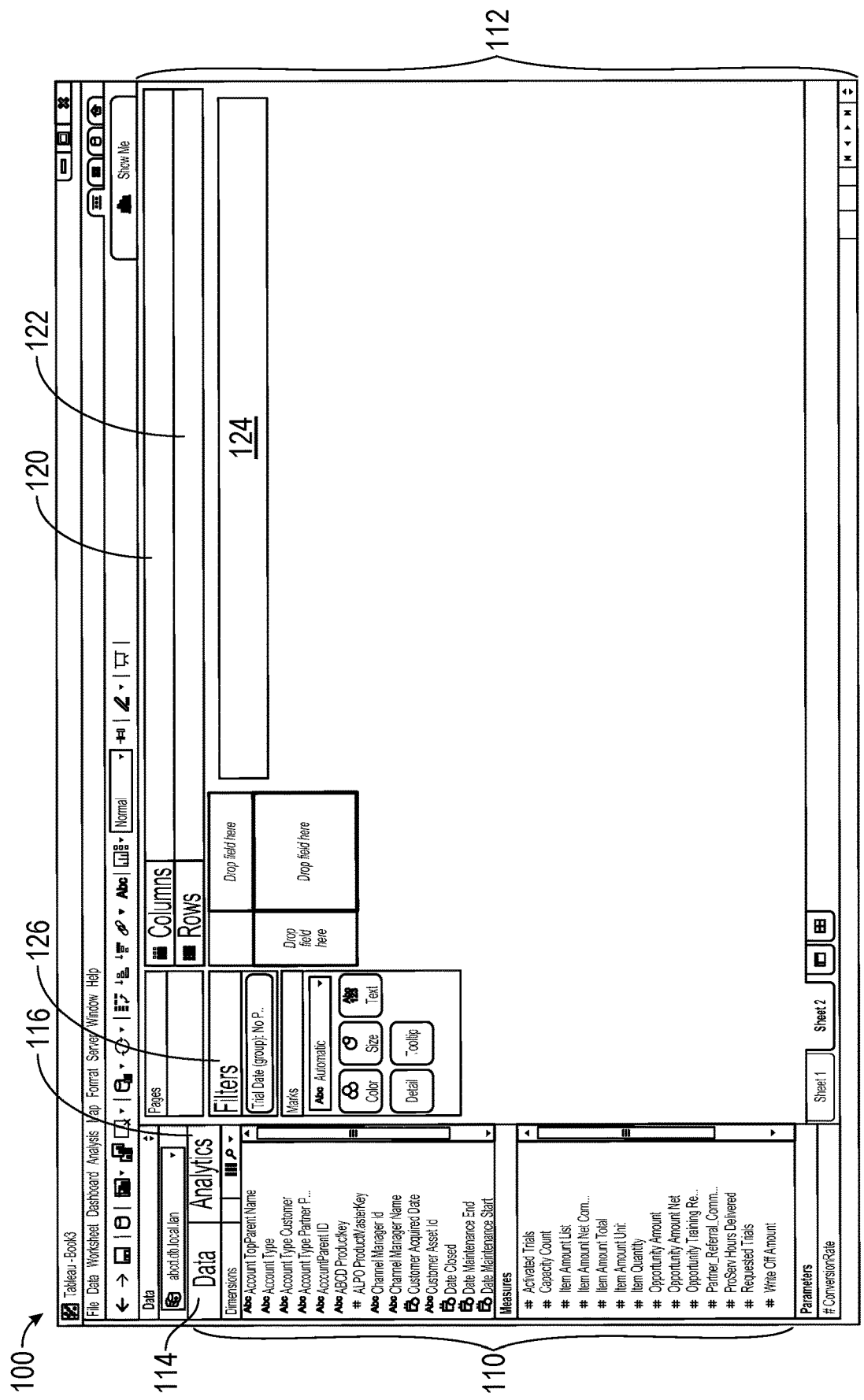
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing the command in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language box 124) to further explore the displayed data visualization. In some instances, a user creates the initial association using the natural language input box 124, which results in one or more data elements being placed in the column shelf 120 and the row shelf 122. For example, the user may provide a command to create a relationship between data element X and data element Y. In response to receiving the command, the column shelf 120 and the row shelf 122 may be populated with the data elements (e.g., the column shelf 120 may be populated with data element X and the row shelf 122 may be populated with data element Y, or vice versa).

Figure 2:
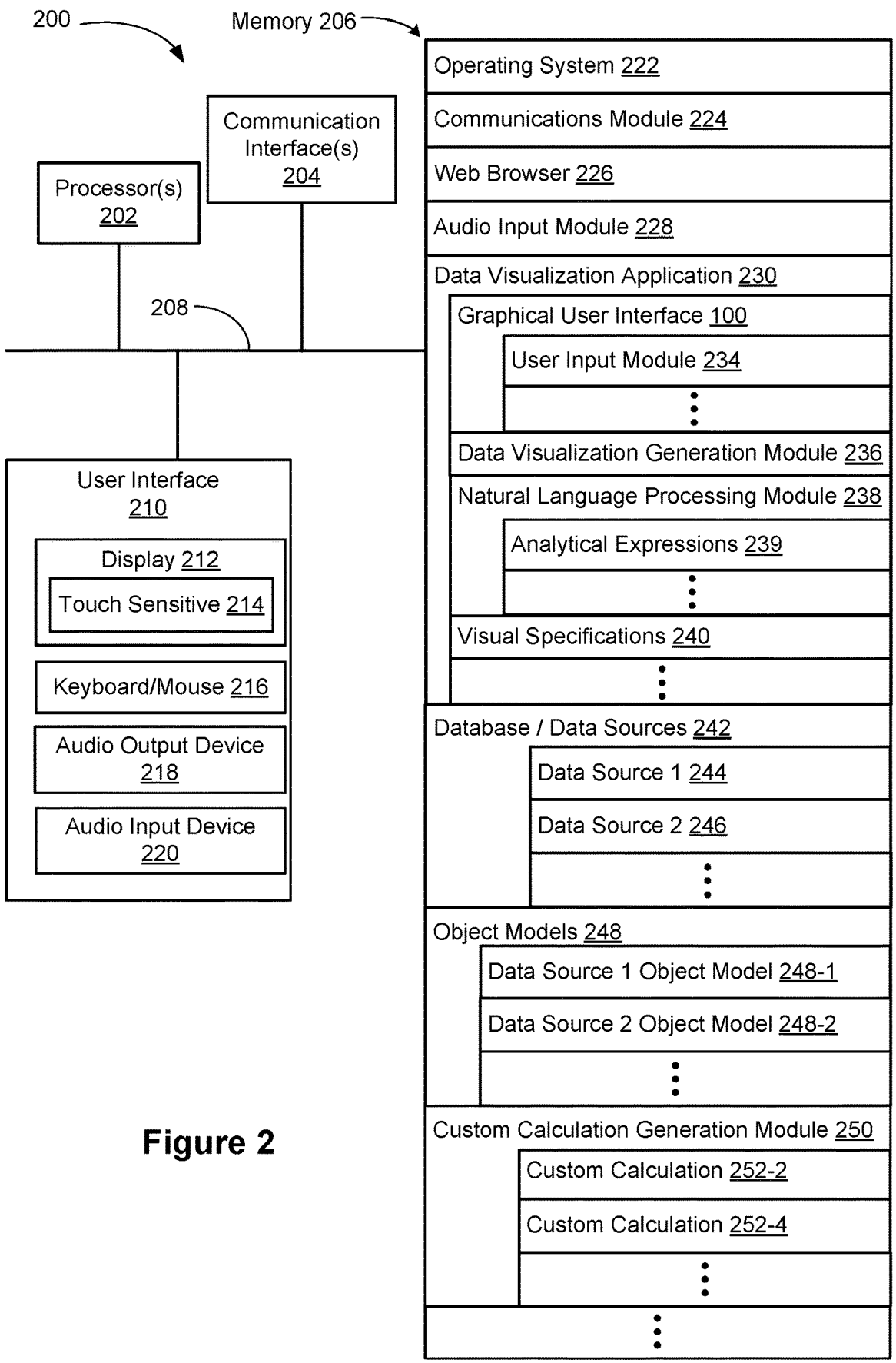
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. Optionally, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- optionally, a web browser 226 (or other application capable of displaying web pages), which enables a user to communicate over a network with remote computers or devices;
- optionally, an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. In some implementations, the data visualization application 230 also includes:
  - a graphical user interface 100 for a user to construct visual graphics. In some implementations, the graphical user interface includes a user input module 234 for receiving user input through the natural language box 124 (FIG. 1). For example, a user inputs a natural language command or expression into the natural language box 124 identifying one or more data sources 242 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a standalone application (e.g., a desktop application). In some implementations, the data visualization application 230 executes within the web browser 226 or another application using web pages provided by a web server;
  - a data visualization generation module 236, which automatically generates and displays a corresponding visual graphic (also referred to as a "data visualization" or a "data viz") using the user input (e.g., the natural language input);
  - optionally, a natural language processing module 238 for processing (e.g., interpreting) natural language inputs (e.g., commands) received using the natural language box 124. In some implementations, the natural language processing module 238 parses the natural language command (e.g., into tokens) and translates the command into an intermediate language (e.g., ArkLang). The natural language processing module 238 includes analytical expressions 239 that are used by natural language processing module 238 to form intermediate expressions of the natural language command. The natural language processing module 238 also translates (e.g., compiles) the intermediate expressions into database queries by employing a visualization query language to issue the queries against a database or data source 242 and to retrieve one or more data sets from the database or data source 242;
  - visual specifications 240, which are used to define characteristics of a desired data visualization. In some implementations, the information the user provides (e.g., user input) is stored as a visual specification. In some implementations, the visual specifications 240 includes previous natural language commands received from a user or properties specified by the user through natural language commands. In some implementations, the visual specification 240 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," which is incorporated by reference herein in its entirety;
- zero or more databases or data sources 242 (e.g., a first data source 244 and a second data source 246), which are used by the data visualization application 230. In some implementations, the data sources are stored as spreadsheet files, CSV files, XML files, flat files, or JSON files, or stored in a relational database. For example, a user selects one or more databases or data sources 242 (which may be stored on the computing device 200 or stored remotely), selects data fields from the data source(s), and uses the selected fields to define a visual graphic;
- zero or more object models 248 (e.g., a first object model 248-1 corresponding to the data source 244, and a second object model corresponding to the data source 246. The object models 248 represent a logical organization of tables (or objects) in a data source, according to some implementations. In some implementations, the object model 248 encodes relationships between logical and/or physical tables of a data source; and a custom calculation generation module 250 that generates and/or stores custom calculations 252 (e.g., custom calculations 252-2, 252-4; sometimes called Level of Detail (LOD) calculations) based on user selection of data fields (e.g., dimensions, measures) or objects of a data source.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Figure 3A:
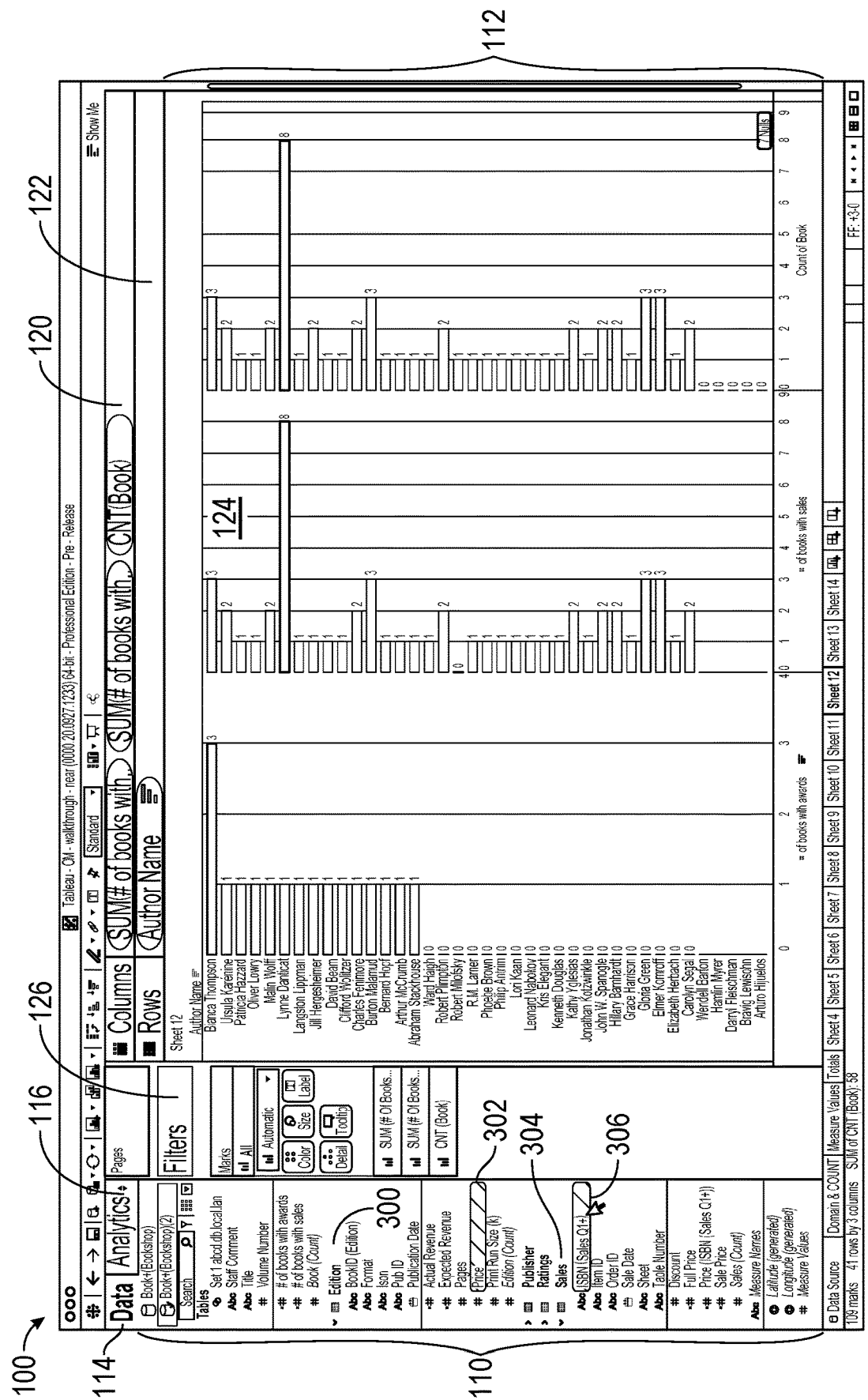
FIGS. 3A and 3B illustrate a graphical user interface for generating Level of Detail (LOD) expressions, according to some implementations.
Figure 3B:
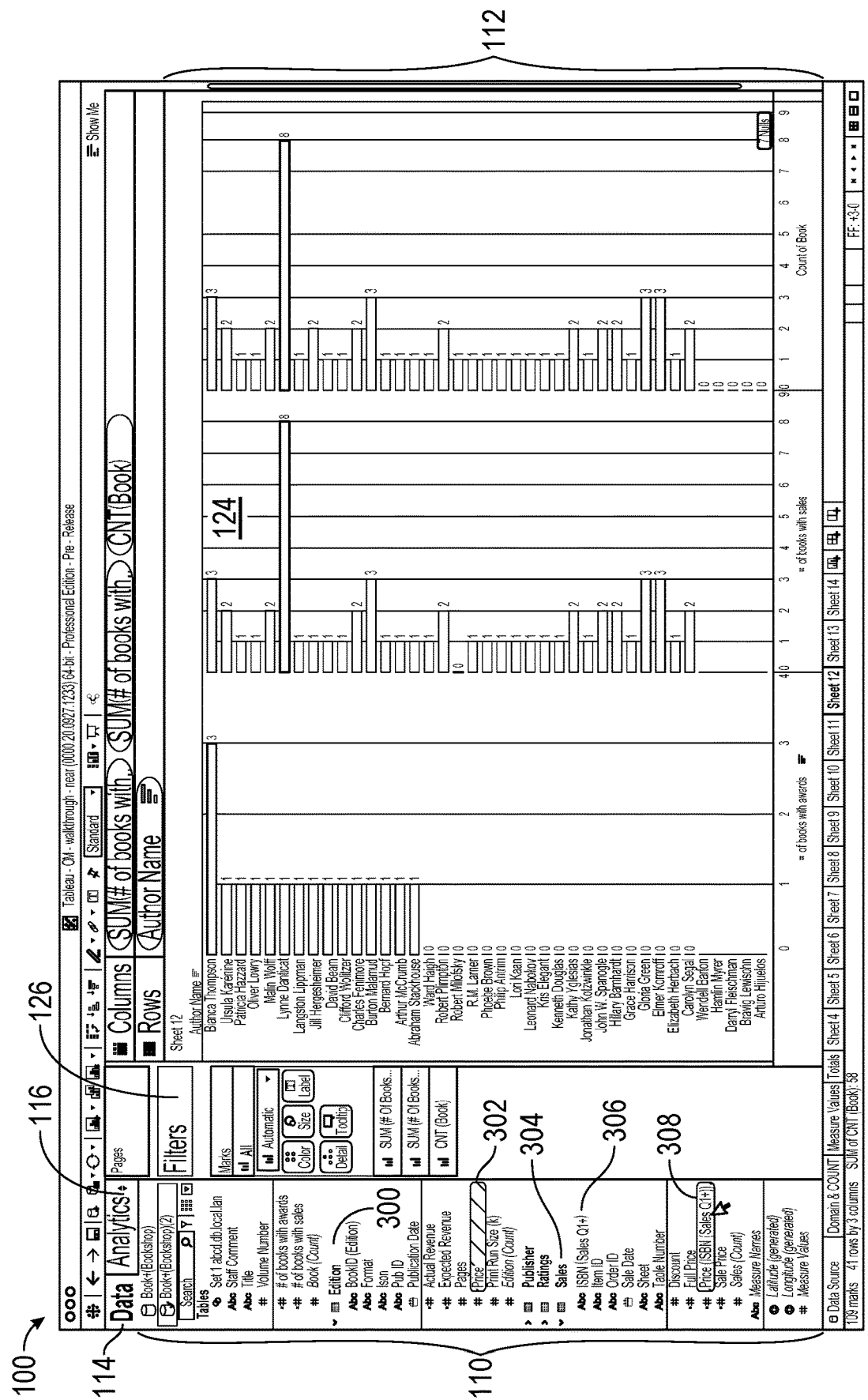

Generating Level of Detail for Data Visualizations Based on User Input on a User Interface FIGS. 3A and 3B illustrate a graphical user interface 100 for generating Level of Detail (LOD) expressions, according to some implementations. Some implementations allow a user to generate LOD expressions by dragging a measure data field onto a dimension data field. For example, the user may drag a Sales data field onto a Product data field, and the system (e.g., the custom calculation generation module 250) automatically generates an LOD expression that aggregates Sales by Product. The LOD expression is {FIXED [Product]: SUM([Sales])}. In some implementations, this calculation is assigned a name as a new calculated field, and the calculated field appears in the schema information region 110 as a selectable field. In some implementations, after the new LOD calculation is created, the LOD calculation can then be used like any other data field.

As an alternative to a drag and drop operation, some implementations allow a user to select a dimension and a measure, and then bring up a context menu (e.g., using a right-click from the dimension data field). In some implementations, this brings up a dialog window that is prepopulated with the generated LOD expression. The user can then modify the expression (if desired) before saving it. In some implementations, the calculation is saved automatically as a new data field, without bringing up a dialog window.

In FIGS. 3A and 3B, the data field Price 302, which is a measure from an Edition table 300, is dragged over the dimension data field ISBN (Sales Q1+) 306 which is a primary key of a Sales table 304. Some implementations generate a copy of the Price data field 302 in the context of the data field ISBN 306 to create a new LOD expression 308. Some implementations allow the user to create the LOD expression via a context menu (described above and below). Some implementations allow the user to create LOD expressions by dragging and dropping data fields (e.g., using a Command key or a Control key, or similar gestures for creating data fields). Some implementations allow the user to create a measure in the context of a new data field.

Figure 3C:
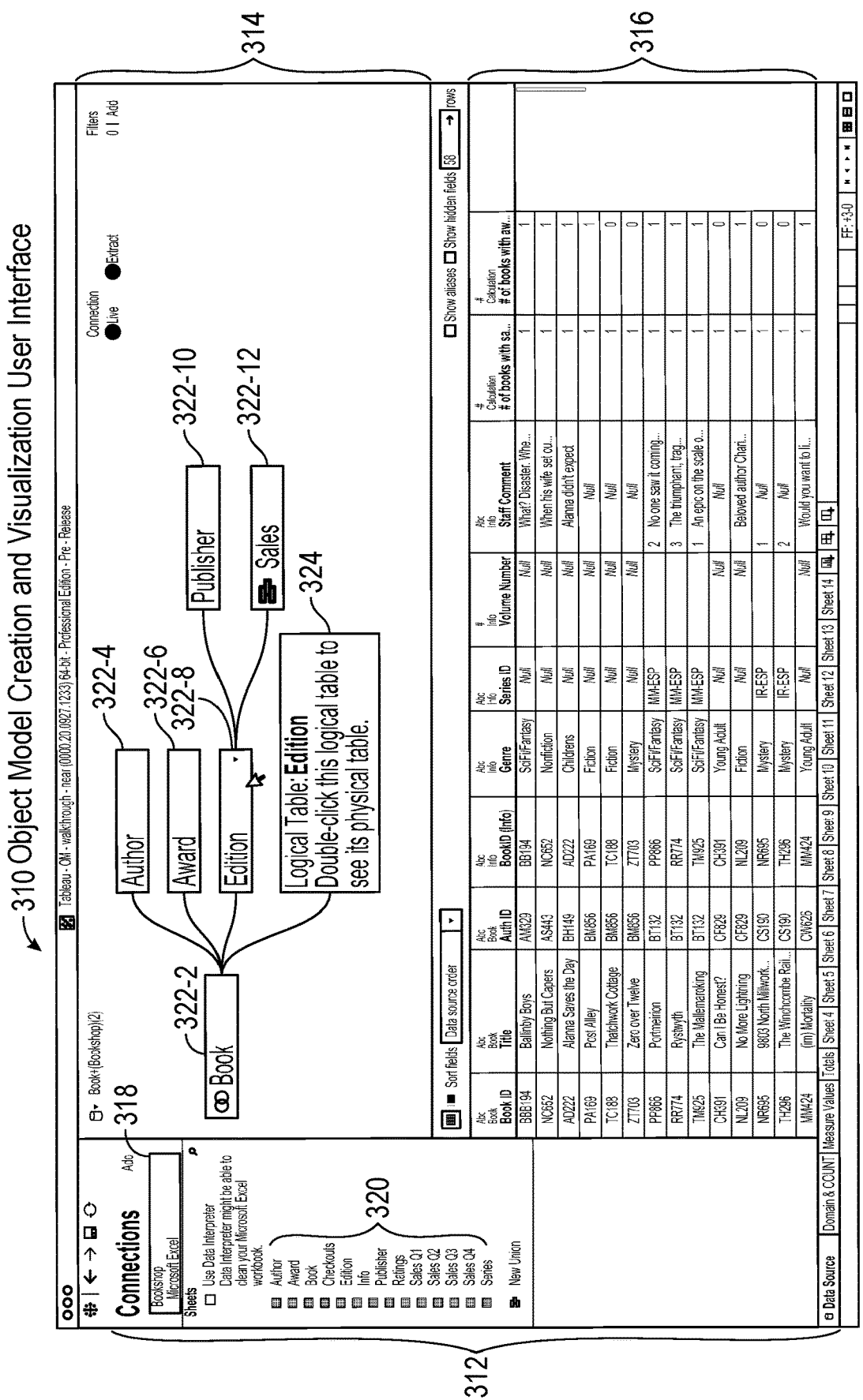
FIGS. 3C, 3D, and 3E show an example user interface for creating and/or visualizing object models, in accordance with some implementations.
Figure 3D:
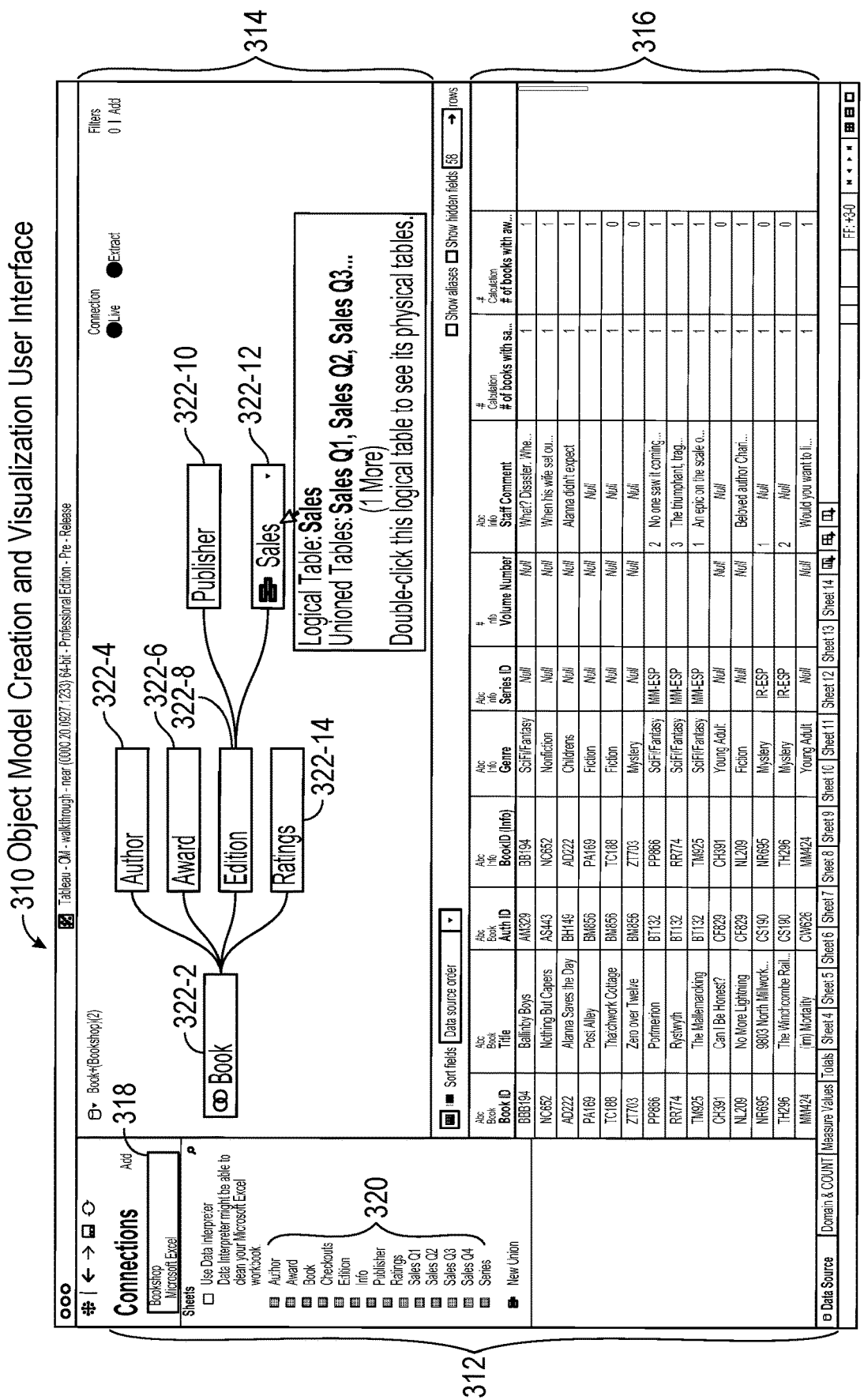
Figure 3E:
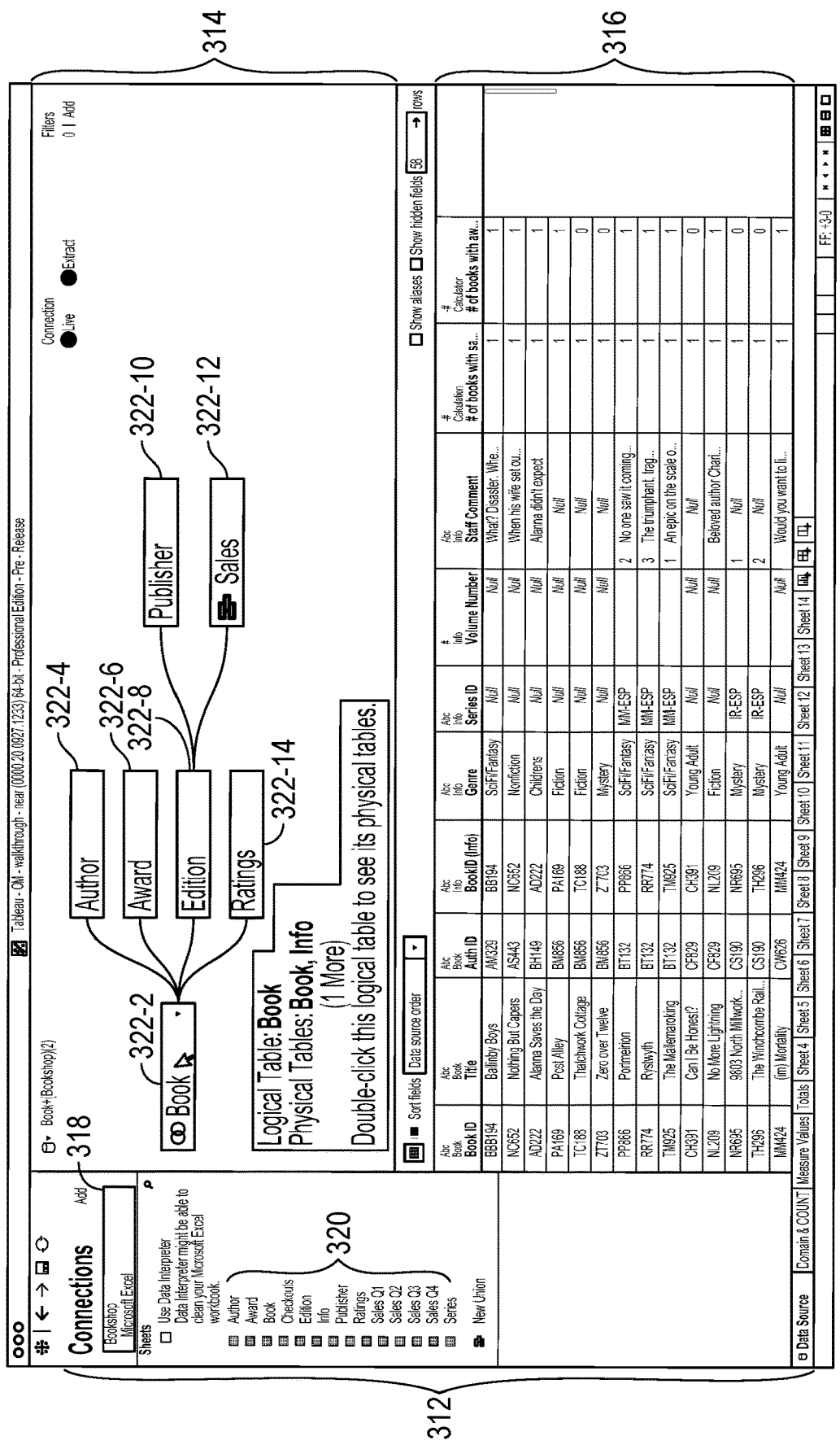

FIGS. 3C, 3D, and 3E show an example user interface 310 for creating and/or visualizing object models, in accordance with some implementations. The user interface 310 includes a connections region 312 that displays data sources. The connections region 318 provides connections to database servers that host databases (or data sources). Each data source includes one or more tables of data 320 that may be selected and used to build an object model. In some implementations, the list of tables are grouped (e.g., according to a logical organization of the tables). The graphical user interface 310 also includes an object model visualization region 314. The object model visualization region 314 displays object models (e.g., a tree or a graph of data objects). The object model displayed includes one or more data object icons (e.g., icons 322-2, 322-4, 322-6, 322-8, 322-10, 322-12, and 322-14). In FIG. 3C, the object model shown in the object model visualization region 314 corresponds to an organization of the tables shown in FIGS. 3A and 3B. Each data object icon in turn represents either a table (e.g., a physical table) or a logical combination of one or more tables. For example, the icon 322-2 represents a Book table, the icon 322-4 represents an Author table, the icon 322-6 represents an Award table, the icon 322-8 represents the Edition table 300, the icon 322-10 represents a Publisher table, the icon 322-12 represents the Sales table 304, and the icon 322-14 represents a Ratings table. In some implementations, the interface 310 also includes a data grid region 306, which displays data fields of one or more data object icons displayed in the object model visualization region 314. In some implementations, a grid region 316 is updated or refreshed in response to detecting a user input in the object model visualization region 314. In FIG. 3C, the visualization region 314 shows the object icon 322-2 highlighted and the grid region 316 displaying details (e.g., data fields) of the Book table corresponding to the object icon 322-2. In some implementations, the grid region shows a first table (e.g., the root of a tree of logical tables or object model) to start with (e.g., when a preexisting object model is loaded), without detecting a user input. If a user navigates away and/or selects an alternative object icon (e.g., the icon 322-4), the grid region is updated to show details of the logical table (or physical table) corresponding to the alternative object icon (e.g., details of the Edition table 300). Some implementations a user can double-click 324 a logical table to view its physical table.

To further illustrate the process of generating LOD expressions, when the user drags the Price data field 302 from the Edition table 300 to the Sales table 304, the system generates a measure which is a row-level Price information for the Sales table 304. The user can subsequently drag the generated measure (e.g., the data field 308) up one level (e.g., to the Edition table 300) or even multiple levels (e.g., two levels up to the Books table). By dragging and dropping the calculated measure, the user can generate a new measure at the right level-of-detail for that context (e.g., a table or a data field). In this way, in addition to allowing the user to drag-and-drop a preexisting measure to generate LOD calculations, (sometimes called custom calculations), some implementations allow the user to drag the custom calculation to a context to create further calculations, treating the custom calculations similar to a pre-existing measure. This process of nesting custom calculations (including LOD expressions) inside other calculations can be extended to any depth as needed.

Figure 4A:
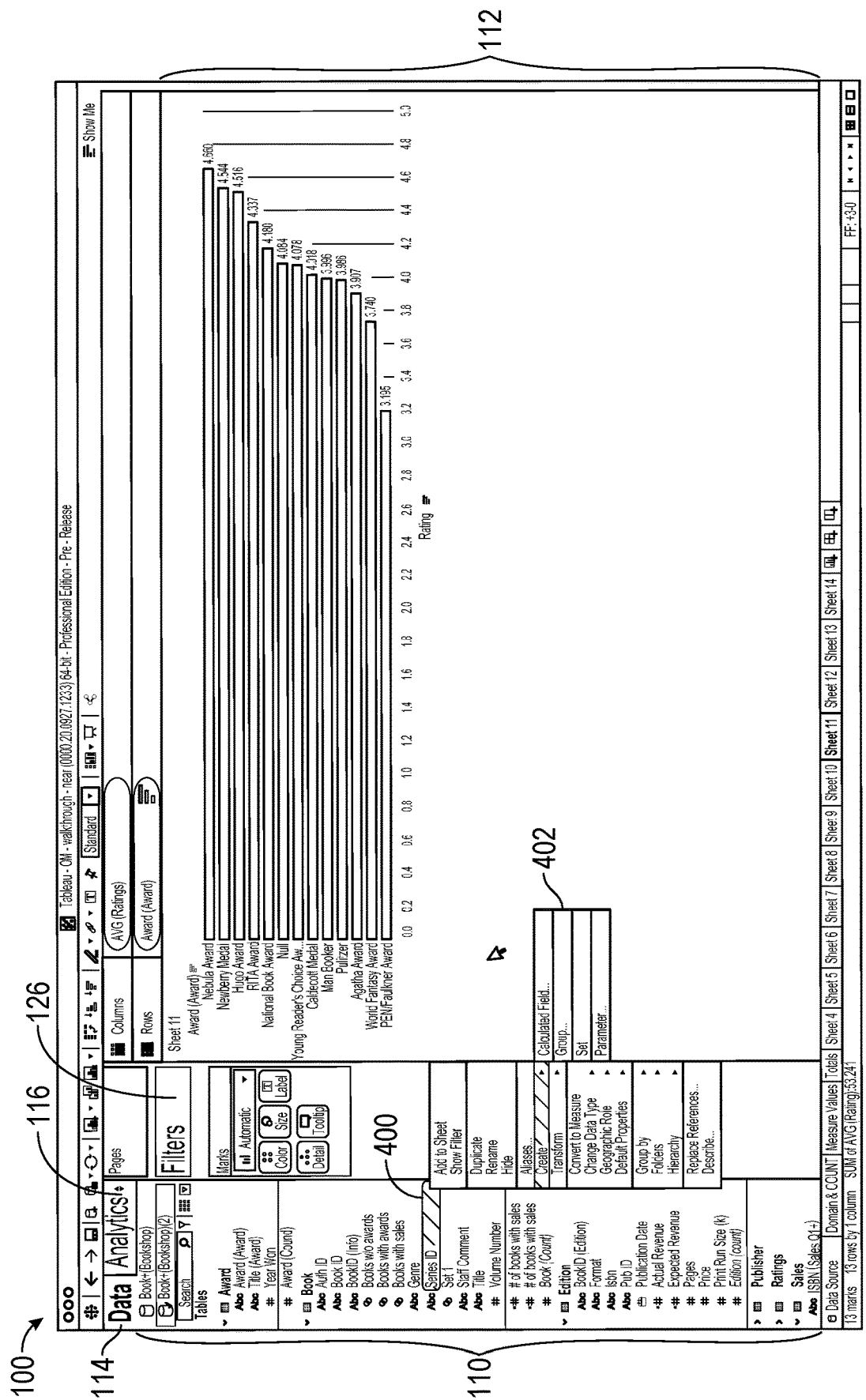
FIGS. 4A-4D show an alternative way for generating LOD expressions using a context menu, according to some implementations.
Figure 4B:
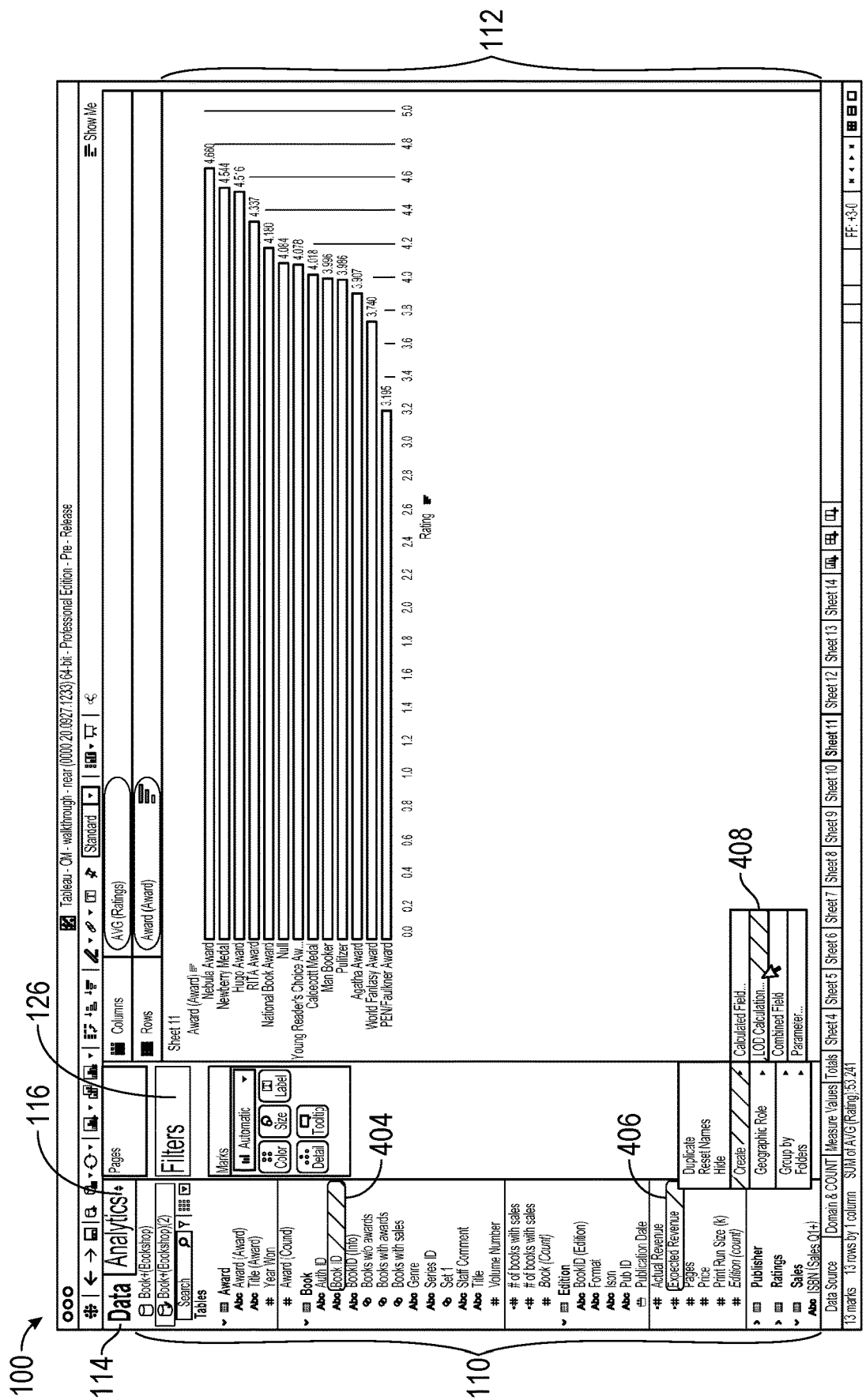
Figure 4C:
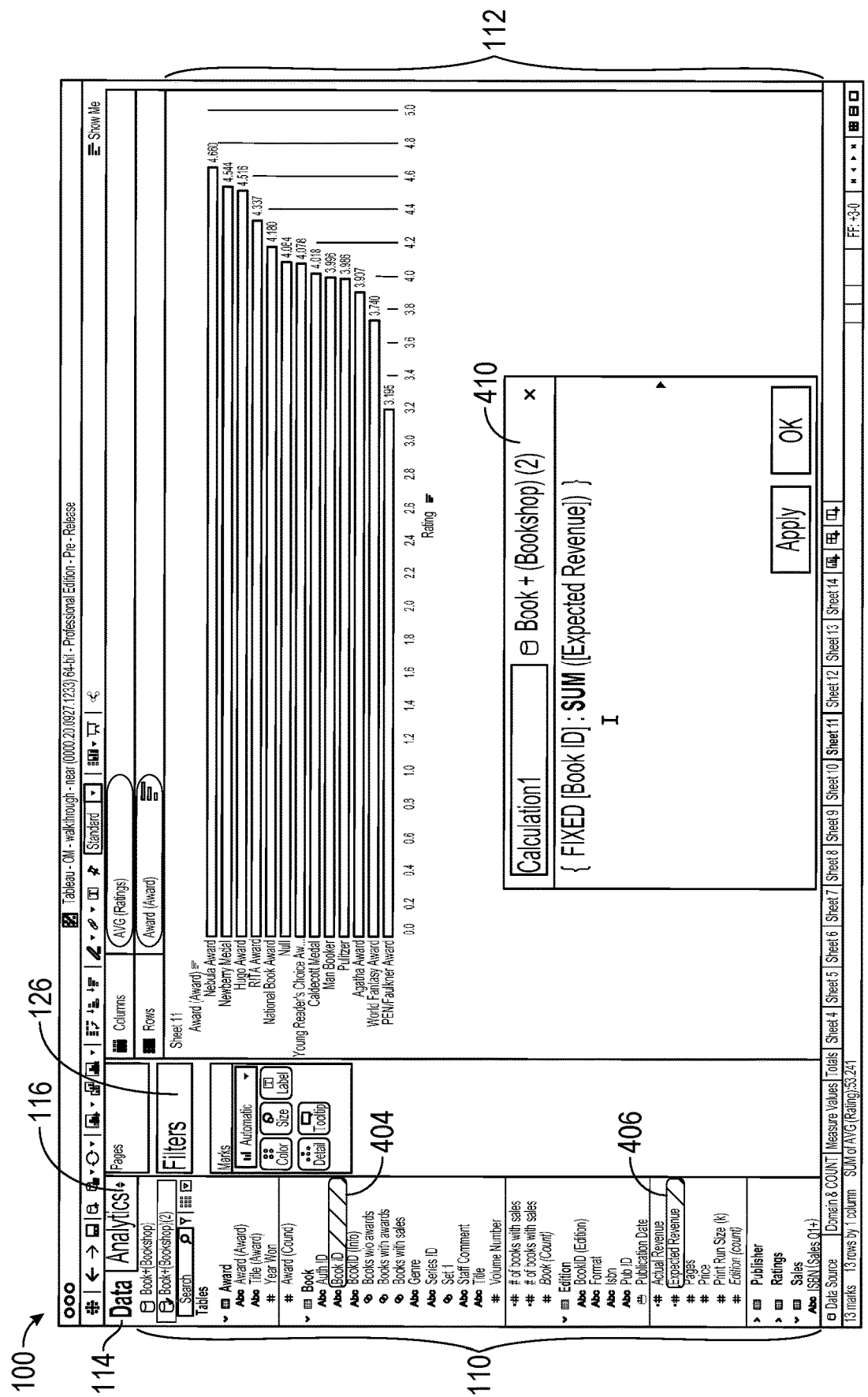
Figure 4D:
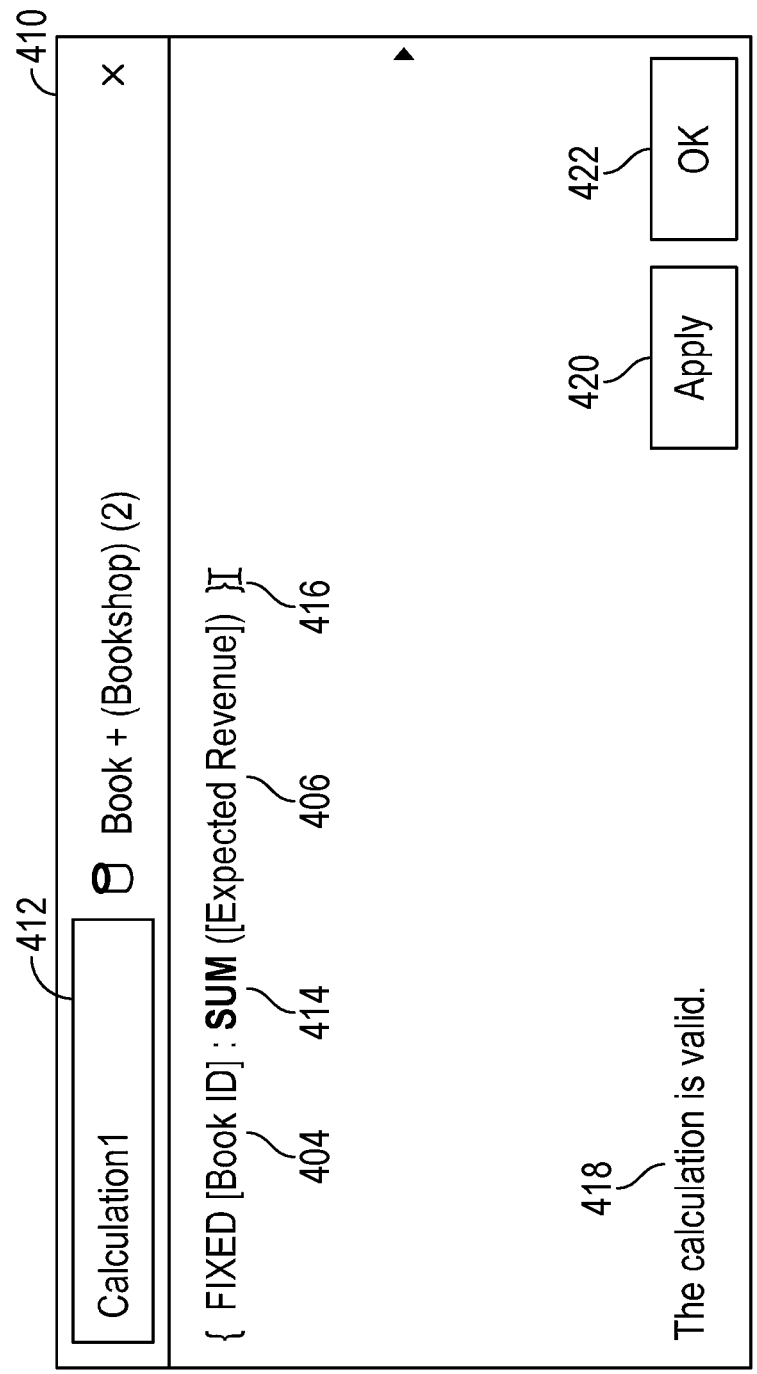

FIGS. 4A-4D show an alternative way for generating LOD expressions using a context menu, according to some implementations. Before any measure is created, as shown in FIG. 4A, when a user selects a data field (e.g., Series ID data field 400 in the Book table), the system does not show any LOD calculations. Next, as shown in FIG. 4B, after a dimension and a measure are selected, when the user selects a data field (e.g., Book ID data field 404), followed by a right-click on another data field (e.g., Expected Revenue data field 406), the system shows a context menu 408 to create a LOD calculation, according to some implementations. When the user selects LOD calculation as the option, the system shows a pop-up window 410 to create the LOD calculation, according to some implementations. This is illustrated in FIG. 4C. FIG. 4D shows an enlarged view of the pop-up window 410. Some implementations allow the user to name 412 the calculation. Some implementations allow the user to edit LOD calculation 416. For example, the user can change SUM 414 to AVG or similar calculations. Some implementations validate the LOD calculation and/or show results of the validation (e.g., information 418). Some implementations show affordances (e.g., the Apply button 420 and OK button 422) to apply the LOD calculation (e.g., to check validity of the LOD Calculation), and/or accept entry or close the pop-up window.

Figure 5A:
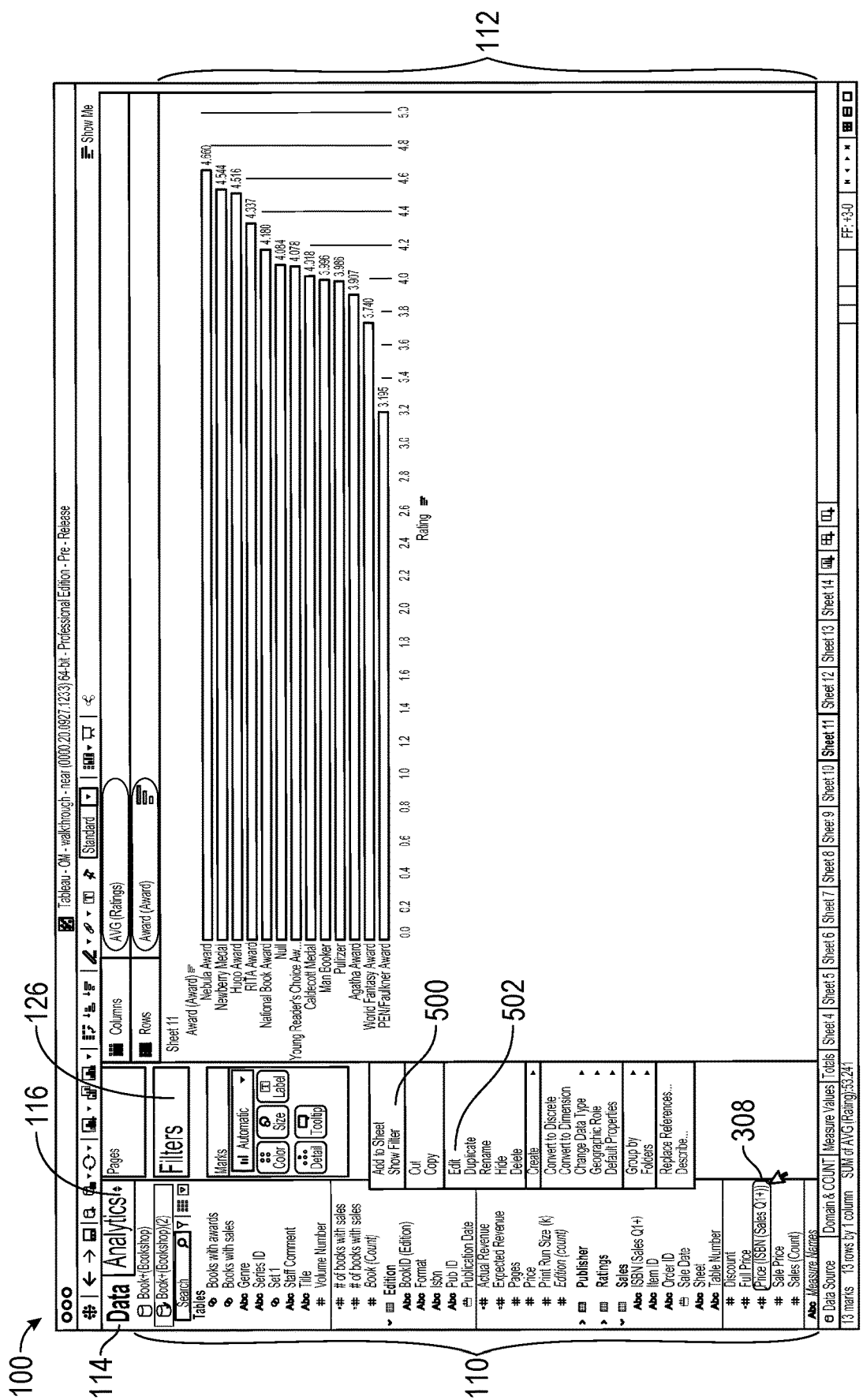
FIGS. 5A, 5B, and 5C show an example user interface for viewing and/or editing details of a previously generated LOD calculation, according to some implementations.
Figure 5B:
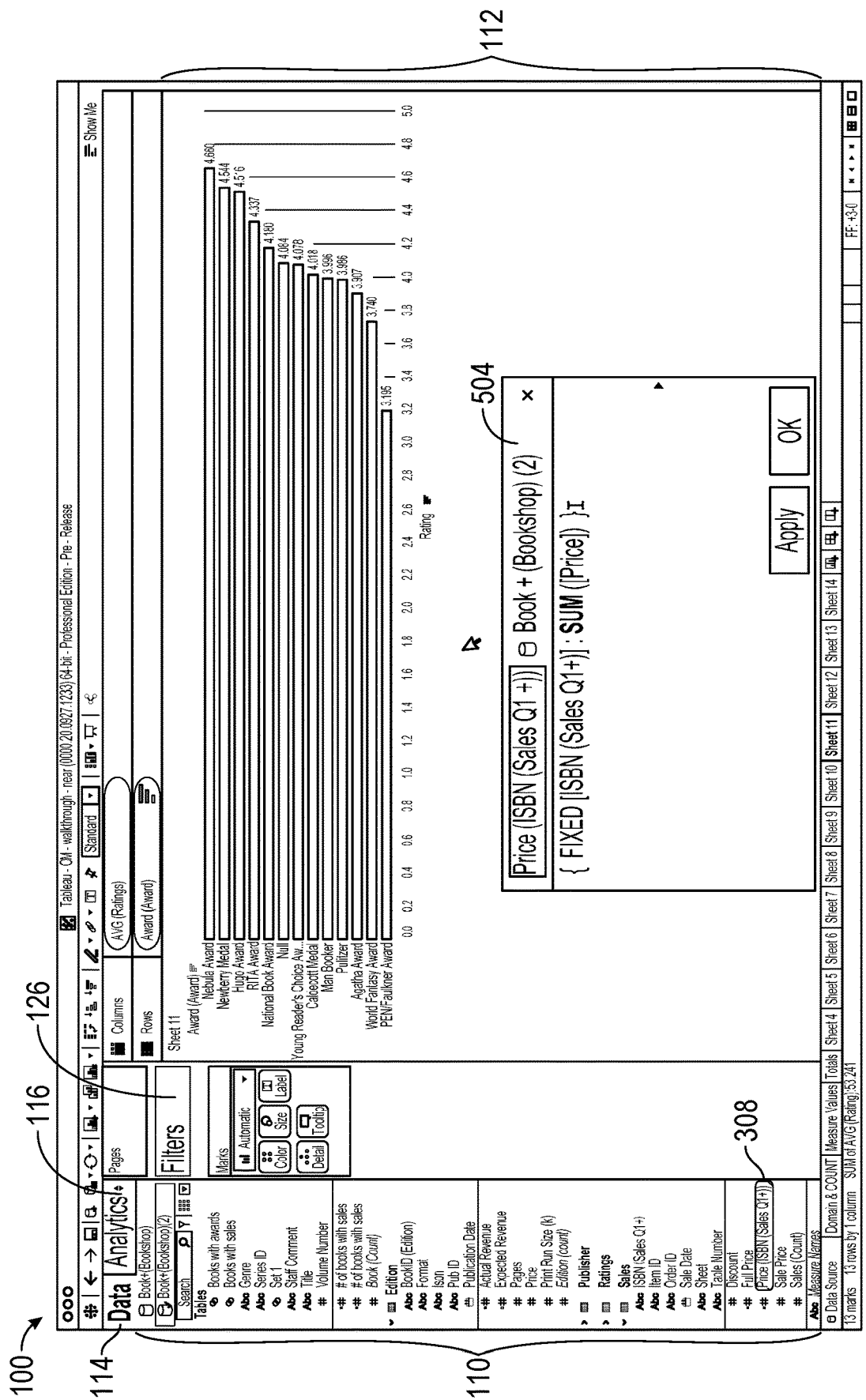
Figure 5C:
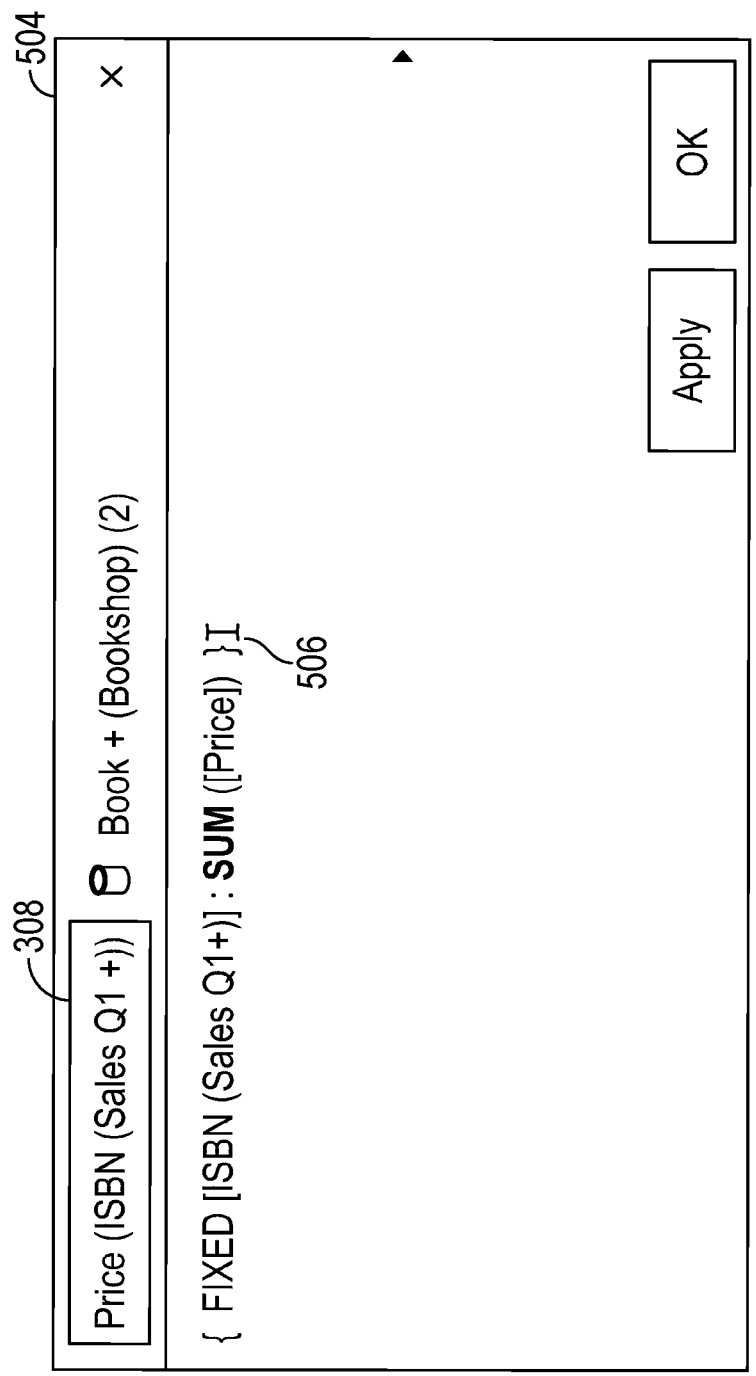

FIG. 5A shows an example user interface for viewing and/or editing details of a previously generated LOD calculation, according to some implementations. In the example shown, when the user selects the LOD calculation 308 (generated as described above in reference to FIGS. 3A-3E), the system responds by showing a drop-down menu 500 that includes an option 502 to edit the field. Suppose the user selects to edit the field, the system shows a pop-up window 504 (shown in FIG. 5B) to view and/or edit the details of the data field 308. FIG. 5C shows an enlarged view of the pop-up window 504, according to some implementations. Similar to FIG. 4D, the user can edit fields of the LOD calculation 506, according to some implementations.

Figure 6:
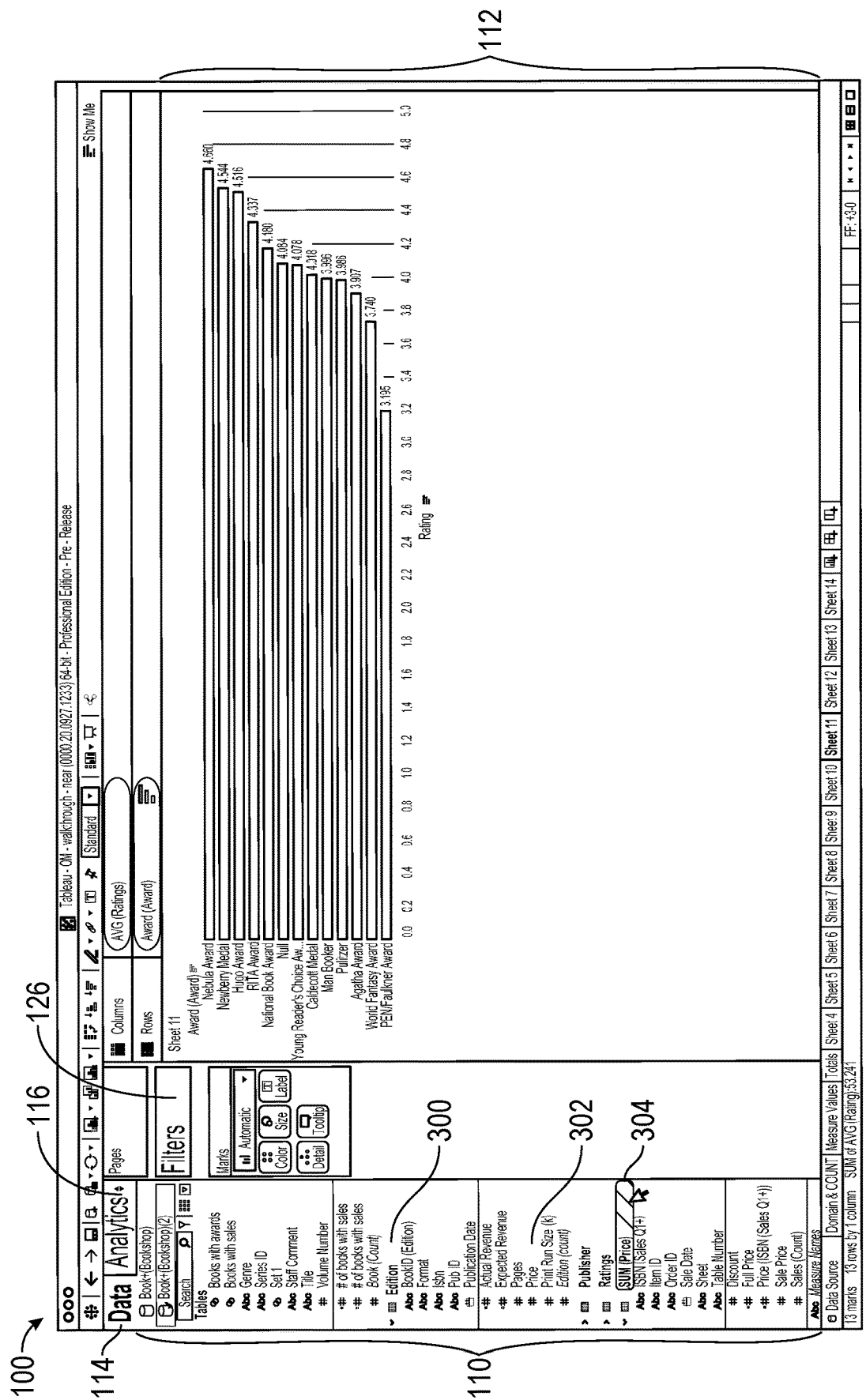
FIG. 6 illustrates a graphical user interface for generating Level of Detail (LOD) expressions, according to some implementations.

Some implementations track primary and foreign keys for a table. Suppose a user drags a measure onto a table (as opposed to a data field of the table), some implementations generate a LOD calculation based on the primary key of the table. For example, as shown in FIG. 6, suppose the user drags the Price data field from the Edition table over the Sales table 304. In response, the system detects that the Sales table 304 has a primary key, and uses that primary key as the data field for generating an LOD calculation. Some implementations allow the user to use a plurality of data fields for generating an LOD calculation. For example, the user can select a second data field after dragging a measure over a first data field, and thereby create a LOD Calculation based on the first data field and the second data field.

Figure 7:
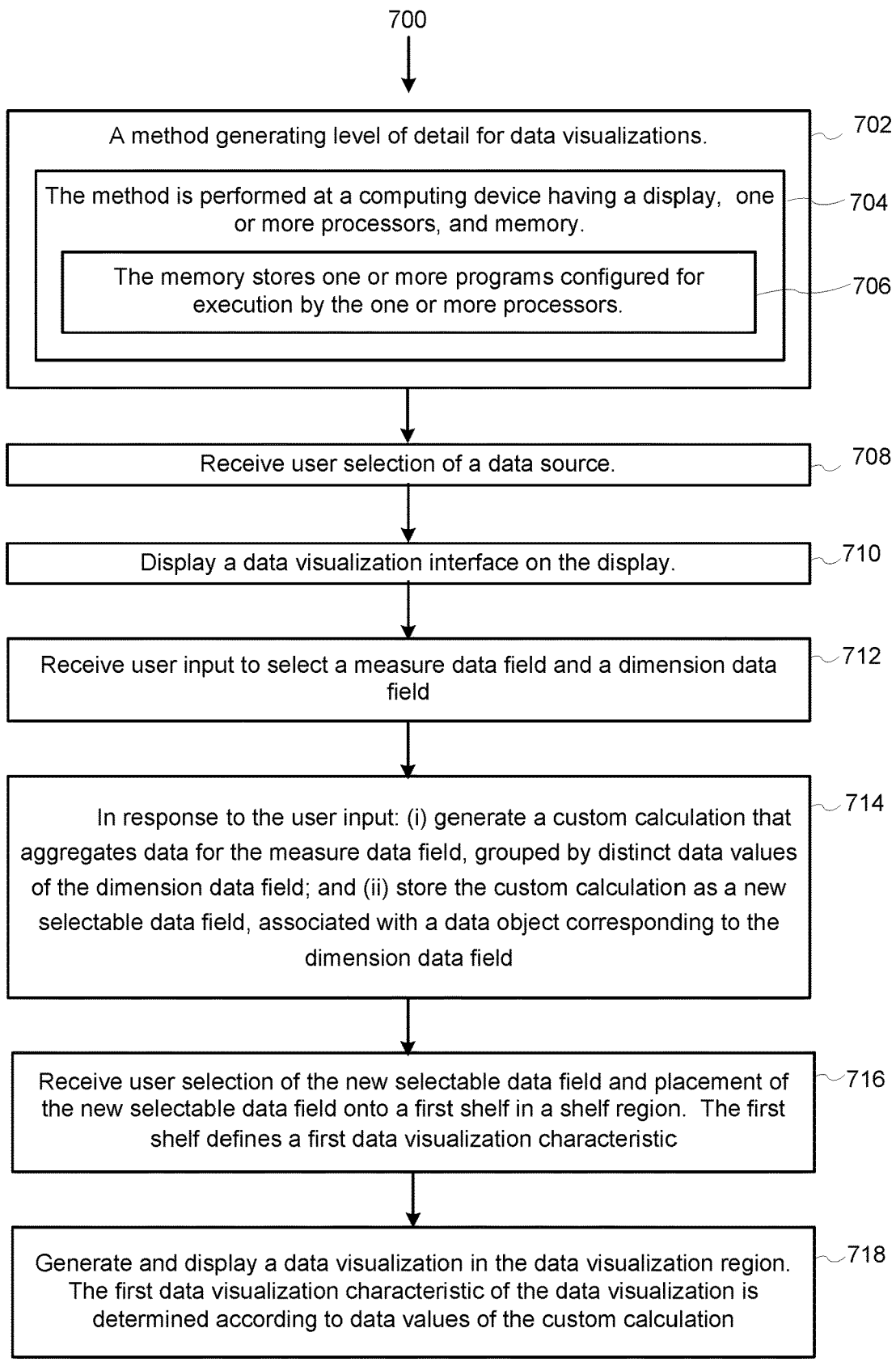
FIG. 7 provides a flowchart of a method for generating level of detail expressions for data visualizations in accordance with some implementations.

FIG. 7 provides a flowchart of a method 700 for generating (702) level of detail calculations for data visualizations in accordance with some implementations. The method 700 is also called a process.

The method 700 is performed (704) at a computing device 200 that has a display 212, one or more processors 202, and memory 206. The memory 206 stores (706) one or more programs configured for execution by the one or more processors 202. In some implementations, the operations performed by the computing device correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method may be combined and/or the order of some operations may be changed.

The method includes receiving (708) user selection of a data source. For example, in FIG. 3, the user selects the Book data source. The method also includes displaying (710) a data visualization interface, including: a data visualization region 112; a shelf region with a plurality of shelves (e.g., the shelves 120 and 122), each shelf defining a respective characteristic of a data visualization based on placement of data fields onto the respective shelf; and a schema information region 110 displaying a plurality of data objects (sometimes called tables). Each data object has one or more selectable data fields, and each data field is designated as a dimension or a measure.

The method also includes receiving (712) user input to select a measure data field and a dimension data field from the schema information region. Examples of such user input are described above in reference to FIGS. 3A-3E, according to some implementations.

The method also includes, in response to the user input (714): generating a custom calculation that aggregates data for the measure data field, grouped by distinct data values of the dimension data field; and storing the custom calculation as a new selectable data field, associated with a data object corresponding to the dimension data field. Examples of generating custom calculation and storing the custom calculation as a selectable data field are described above in reference to FIGS. 3A-3E, according to some implementations.

The method also includes receiving (716) user selection of the new selectable data field and placement of the new selectable data field onto a first shelf in the shelf region, wherein the first shelf defines a first data visualization characteristic; and generating and displaying (718) a data visualization in the data visualization region, wherein the first data visualization characteristic of the data visualization is determined according to data values of the custom calculation. Examples of user selection of the new data field, placement of data fields onto a shelf region, and/or generating and displaying data visualizations are described above in reference to FIGS. 1, 2, 3A-3E, and 4A-4D, according to some implementations.

In some implementations, the user input is a drag-and-drop operation comprising dragging the measure data field and dropping the measure data field over the dimension data field. In some implementations, the dimension data field is a primary key or alternative key of the data object corresponding to the dimension data field. In some implementations, the user input further comprises: user initiation of a context menu associated with the measure data field or the dimension data field; and selecting a context menu option to build the custom calculation. In some implementations, the method further includes, in response to the user selection of the context menu option: displaying a dialog window, populated by the generated custom calculation; and detecting a second user input in the dialog window to edit the custom calculation, and storing the custom calculation as a new selectable data field is in response to detecting user activation of a save affordance in the dialog window.

In some implementations, the custom calculation is of the form {FIXED [field1]: AGG([field2])}, where "field1" is a name of the dimension data field, "AGG" is an aggregation operator, and "field2" is a name of the measure data field. In some implementations, the aggregation operator is one of SUM, COUNT, AVERAGE, MIN, and MAX.

In some implementations, generating and displaying the data visualization in the data visualization region includes: generating one or more database queries directed to the data source according to user placement of data fields from the schema information region onto shelves in the shelf region, including placement of the new selectable data field onto the first shelf; executing the one or more database queries to retrieve one or more data sets from the data source, including aggregated data for the measure data field grouped according to the dimension data field; and generating and displaying the data visualization according to the retrieved data sets.

According to some implementations, a method is provided for determining level of detail for data visualizations. The method is performed at a computing device having a display, one or more processors, and memory storing one or more programs configured for execution by the one or more processors. The method includes displaying a data visualization interface on the display, receiving user selection of a data source, and detecting an input to specify a type of level of detail expression directed to the data source. The method also includes, in response to detecting the input: determining, based on the input, (i) an aggregation type in a first aggregation, (ii) a data field to be aggregated for the first aggregation, and (iii) a grouping for the first aggregation; generating, based on the aggregation type, the data field, and the grouping, one or more database queries, including the first aggregation, according to the data source; executing the one or more database queries to retrieve one or more data sets from the data source, aggregated according to the first aggregation; and generating and displaying an updated data visualization of the retrieved data sets.

In some implementations, the first aggregation is a measure and the data field is a dimension of the data source. In some implementations, the input is a drag-and-drop operation comprising dragging the first aggregation and dropping it over the data field. In some implementations, the input is a right-click operation on the data field, and the method further includes displaying a context menu or a dialog that allows a user to specify a measure or a calculation, and determining the first aggregation based on the measure or the calculation.

In some implementations, the input is a drag-and-drop operation comprising dragging the first aggregation and dropping it over a table, and the method further includes retrieving a primary key associated with the table and using the primary key as the data field.

In some implementations, the method further includes: displaying the first aggregation; detecting a second input to view details of the first aggregation; in response to detecting the second input, displaying a calculation or measure corresponding to the first aggregation; detecting a third input to modify the calculation or measure; and in response to detecting the third input, updating the first aggregation.

Some implementations enable users to specify LOD by using drag and drop operations. Some implementations generate calculated fields in a schema viewer. Some implementations include a calculation dialog. Some implementations allow users to specify ad-hoc calculations, and/or other pills (e.g., a pill context menu) for specifying LOD. Some implementations provide user feedback to allow the user to know if their calculations meet their expectations.

Some implementations allow the user to specify the type of LOD by using one of the following syntaxes: {FIXED dims: calcs} (FIXED, INCLUDE, or EXCLUDE), {calcs}, {INCLUDE: calcs} (INCLUDE, or EXCLUDE).

Some implementations allow users to select different types of LOD: FIXED, INCLUDE, or EXCLUDE. Some implementations allow a user to drag a calculation onto a dimension, or drag a set of dimensions onto a calculation. Some implementations assume that interactions between two components of LOD calculations are equivalent, and that order is implicit. Some implementations assume a FIXED type of LOD by default, and provide a context menu for the user to change the type.

Some implementations detect right-click drag, and/or show options after the user releases a mouse, to select different types of LOD.

Some implementations detect a secondary drop target after an initial drop, similar to how some data visualization platforms detect user input for improved analytics (e.g., input provided in an analytics pane for Table, Pane, or Cell).

Some implementations detect user input to determine interactions between data fields.

Some implementations determine a defining dimension for objects (e.g., a friendly field name of a primary key) based on detecting user input and/or metadata information related to the object.

Some implementations detect user input to determine interactions between dimensions and calculations or measures. Some implementations detect user input to determine interactions between dimensions, or between dimensions and hierarchical database models.

Some implementations detect user input to determine dimensions, and/or categorize each dimension as a string, a date/time field, a set of bins, part of combined fields, or part of a hierarchy.

Some implementations detect user input to change aggregation on measures.

Some implementations detect user input to determine the specific type of LOD (e.g., {FIXED dim: COUNTD(dim2)}, {FIXED YEAR(Order Date): SUM(Sales)}). Some implementations detect user input to change the hierarchy within dimensions.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating level of detail calculations for data visualizations, comprising:

at a computing device having a display, one or more processors, and memory storing one or more programs configured for execution by the one or more processors:
  receiving user selection of a data source;
  displaying a data visualization interface, including:
    a data visualization region;
    a shelf region with a plurality of shelves, each shelf defining a respective characteristic of a data visualization based on placement of data fields onto the respective shelf; and
    a schema information region displaying a plurality of data objects, wherein each of the data objects has one or more selectable data fields from the data source and each of the data fields is designated as a dimension or a measure;
  receiving user input to select a measure data field and a dimension data field from the schema information region, the measure data field representing quantitative data and the dimension data field representing categorical data;
  in response to the user input:
    generating a custom calculation that groups data values of the dimension data field according to one or more respective distinct data values of the dimension data field and executes an aggregation function to aggregate data values of the measure data field for each of the one or more distinct data values of the dimension data field;
    storing the custom calculation as a new selectable data field, associated with a first data object corresponding to the dimension data field; and
    displaying the new selectable data field as a data field for the first data object in the schema information region;
  receiving user selection of the new selectable data field from the schema information region and placement of the new selectable data field onto a first shelf in the shelf region, wherein the first shelf defines a first data visualization characteristic; and
  generating and displaying a data visualization in the data visualization region, wherein the first data visualization characteristic of the data visualization is determined according to data values of the custom calculation.

2. The method of claim 1, wherein the user input is a drag-and-drop operation comprising dragging the measure data field and dropping the measure data field over the dimension data field.

3. The method of claim 2, wherein the dimension data field is a primary key or alternative key of a data object corresponding to the dimension data field.

4. The method of claim 1, wherein the user input further comprises:
  user initiation of a context menu associated with the measure data field or the dimension data field; and
  user selection of a context menu option to build the custom calculation.

5. The method of claim 4, further comprising in response to the user selection of the context menu option:
  displaying a dialog window, populated by the generated custom calculation; and
  detecting a second user input in the dialog window to edit the custom calculation;
  wherein storing the custom calculation as a new selectable data field is in response to detecting user activation of a save affordance in the dialog window.

6. The method of claim 1, wherein the custom calculation is of the form {FIXED [field1]: AGG([field2])}, where "field1" is a name of the dimension data field, "AGG" is an aggregation operator, and "field2" is a name of the measure data field.

7. The method of claim 6, wherein the aggregation operator is one of SUM, COUNT, AVERAGE, MIN, and MAX.

8. The method of claim 1, wherein generating and displaying the data visualization in the data visualization region comprises:
  generating one or more database queries directed to the data source according to user placement of data fields from the schema information region onto shelves in the shelf region, including the placement of the new selectable data field onto the first shelf;
  executing the one or more database queries to retrieve one or more data sets from the data source, including aggregated data for the measure data field grouped according to the dimension data field; and
  generating and displaying the data visualization according to the retrieved data sets.

9. A computing device, comprising:
  a display;
  one or more processors; and
  memory coupled to the one or more processors, the memory storing one or more programs configured to be executed by the one or more processors, the one or more programs including instructions for:
  receiving user selection of a data source;
  displaying a data visualization interface, including:
    a data visualization region;
    a shelf region with a plurality of shelves, each shelf defining a respective characteristic of a data visualization based on placement of data fields onto the respective shelf; and
    a schema information region displaying a plurality of data objects, wherein each of the data objects has one or more selectable data fields from the data source and each of the data fields is designated as a dimension or a measure;
  receiving user input to select a measure data field and a dimension data field from the schema information region, the measure data field representing quantitative data and the dimension data field representing categorical data;
  in response to the user input:
    generating a custom calculation that groups data values of the dimension data field according to one or more respective distinct data values of the dimension data field and executes an aggregation function to aggregate data values of the measure data field for each of the one or more distinct data values of the dimension data field;
    storing the custom calculation as a new selectable data field, associated with a first data object corresponding to the dimension data field; and
    displaying the new selectable data field as a data field for the first data object in the schema information region;
  receiving user selection of the new selectable data field from the schema information region and placement of the new selectable data field onto a first shelf in the shelf region, wherein the first shelf defines a first data visualization characteristic; and generating and displaying a data visualization in the data visualization region, wherein the first data visualization characteristic of the data visualization is determined according to data values of the custom calculation.

10. The computing device of claim 9, wherein the user input is a drag-and-drop operation comprising dragging the measure data field and dropping the measure data field over the dimension data field.

11. The computing device of claim 10, wherein the dimension data field is a primary key or alternative key of a data object corresponding to the dimension data field.

12. The computing device of claim 9, wherein the user input further comprises:

user initiation of a context menu associated with the measure data field or the dimension data field; and user selection of a context menu option to build the custom calculation.

13. The computing device of claim 12, wherein the one or more programs further comprise instructions for responding to the user selection of the context menu option by:

displaying a dialog window, populated by the generated custom calculation; and detecting a second user input in the dialog window to edit the custom calculation;

wherein storing the custom calculation as a new selectable data field is in response to detecting user activation of a save affordance in the dialog window.

14. The computing device of claim 9, wherein the custom calculation is of the form {FIXED [field1]: AGG([field2])}, where "field1" is a name of the dimension data field, "AGG" is an aggregation operator, and "field2" is a name of the measure data field.

15. The computing device of claim 14, wherein the aggregation operator is one of SUM, COUNT, AVERAGE, MIN, and MAX.

16. The computing device of claim 9, wherein the instructions for generating and displaying the data visualization in the data visualization region further comprise instructions for:

generating one or more database queries directed to the data source according to user placement of data fields from the schema information region onto shelves in the shelf region, including the placement of the new selectable data field onto the first shelf;

executing the one or more database queries to retrieve one or more data sets from the data source, including aggregated data for the measure data field grouped according to the dimension data field; and generating and displaying the data visualization according to the retrieved data sets.

17. A non-transitory computer readable storage medium storing one or more programs configured for execution by a computer system having a display, one or more processors and memory, the one or more programs comprising instructions for:

receiving user selection of a data source;

displaying a data visualization interface, including:

a data visualization region;

a shelf region with a plurality of shelves, each shelf defining a respective characteristic of a data visualization based on placement of data fields onto the respective shelf; and a schema information region displaying a plurality of data objects, wherein each of the data objects has one or more selectable data fields from the data source and each of the data fields is designated as a dimension or a measure;

receiving user input to select a measure data field and a dimension data field from the schema information region, the measure data field representing quantitative data and the dimension data field representing categorical data;

in response to the user input:

generating a custom calculation that groups data values of the dimension data field according to one or more respective distinct data values of the dimension data field and executes an aggregation function to aggregate data values of the measure data field for each of the one or more distinct data values of the dimension data field;

storing the custom calculation as a new selectable data field, associated with a first data object corresponding to the dimension data field; and displaying the new selectable data field as a data field for the first data object in the schema information region;

receiving user selection of the new selectable data field from the schema information region and placement of the new selectable data field onto a first shelf in the shelf region, wherein the first shelf defines a first data visualization characteristic; and generating and displaying a data visualization in the data visualization region, wherein the first data visualization characteristic of the data visualization is determined according to data values of the custom calculation.

18. The computer readable storage medium of claim 17, wherein the user input is a drag-and-drop operation comprising dragging the measure data field and dropping the measure data field over the dimension data field.

19. The computer readable storage medium of claim 17, wherein the user input further comprises:

user initiation of a context menu associated with the measure data field or the dimension data field; and user selection of a context menu option to build the custom calculation.

20. The computer readable storage medium of claim 19, wherein the one or more programs further comprise instructions for responding to the user selection of the context menu option by:

displaying a dialog window, populated by the generated custom calculation; and detecting a second user input in the dialog window to edit the custom calculation;

wherein storing the custom calculation as a new selectable data field is in response to detecting user activation of a save affordance in the dialog window.

* * * * *